Jan. 21, 1958                F. W. WANZENBERG                2,820,648
                            AUTOMOBILE CRASH PAD
                             Filed July 2, 1956
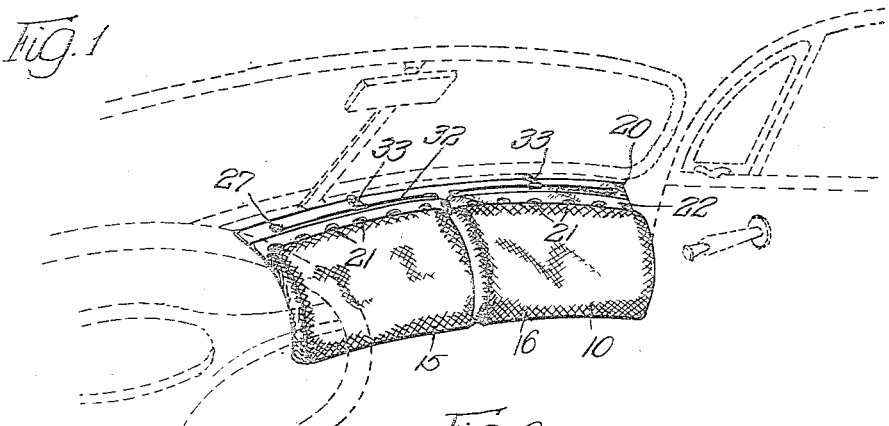
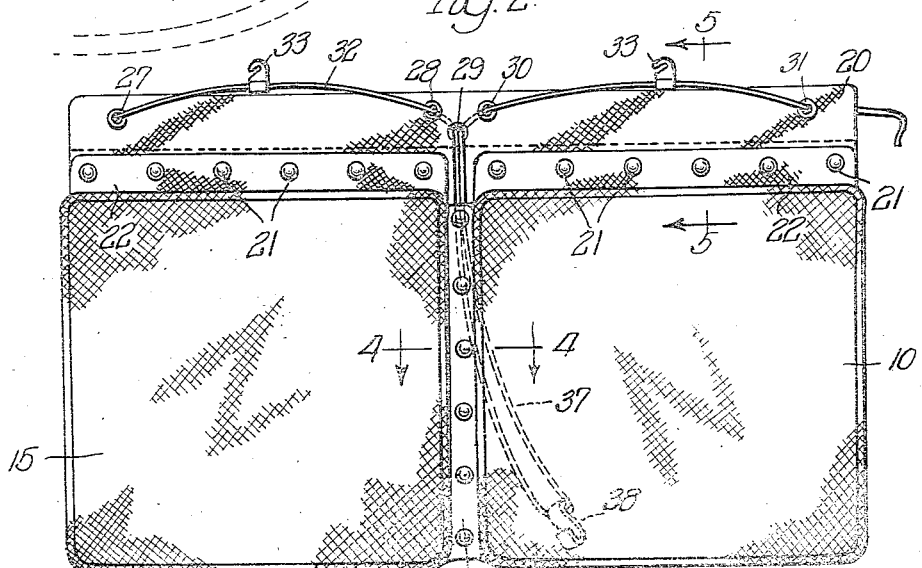
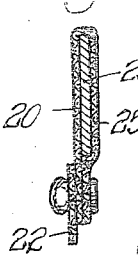
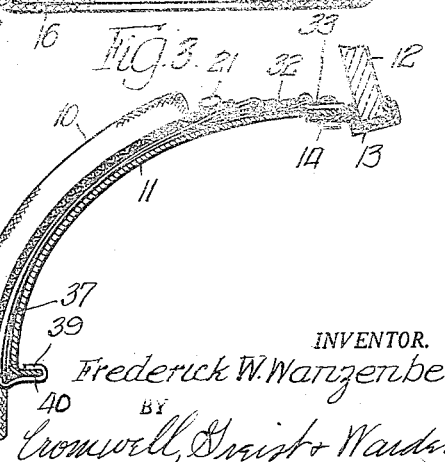
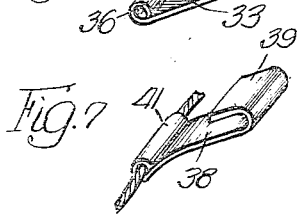
INVENTOR.
Frederick W. Wanzenberg,
BY
Cromwell, Greist & Warden
ATTYS United States Patent Office 2,820,648
Patented Jan. 21, 1958

2,820,648
AUTOMOBILE CRASH PAD

Frederick W. Wanzenberg, Wilmette, Ill., assignor of one half to William Isaacs, Wilmette, Ill.

Application July 2, 1956, Serial No. 595,485

7 Claims. (Cl. 280—150)

This invention relates to protective devices for use in vehicle interiors and is more particularly concerned with improvements in a crash pad for covering and cushioning portions of the dash or instrument panel against which passengers in the front seat of the vehicle are most likely to be thrown in the event of an emergency stop.

It is a general object of the invention to provide an improved vehicle crash pad which is adapted to be detachably secured over portions of the instrument panel or dashboard of the vehicle and which is so constructed and arranged thereon that it will afford substantial protection against injury to a passenger who is hurled against the same by a sudden stopping of the vehicle.

It is a more specific object of the invention to provide a vehicle instrument board crash pad which may be installed in the vehicle in such a manner that the protective pad portion thereof is readily removable from the dashboard, wholly or in part, and which is provided with improved means for installing the same whereby it is adapted for installation in all passenger carrying automotive vehicles of conventional construction.

It is a further object of the invention to provide a vehicle instrument board crash pad comprising a pair of separable pad members detachably connected to a supporting strip member which is in turn detachably connected to a pair of clips adapted to be permanently fastened in the vehicle, the supporting strip being connected to the clip by a cord-like member which is threaded through apertures provided in the strip member and guideways in the clips whereby to permit ready adjustment of the height of the pad members and ready removal and replacement of the pad members and the supporting strip for the same.

Other objects and advantages of the invention will be apparent from a consideration of the crash pad which is shown by way of illustration in the accompanying drawings wherein:

Figure 1 is a perspective view of a crash pad embodying the features of the invention, as it appears when installed on the instrument panel of a passenger vehicle, portions of the latter being indicated in dotted line;

Figure 2 is a plan view of the crash pad and the attaching elements for securing the same in position on the vehicle;

Figure 3 is a vertical cross section through the instrument panel of the vehicle showing the crash pad attached thereto;

Figure 4 is a fragmentary cross section, to an enlarged scale, taken on the line 4—4 of Figure 2;

Figure 5 is a fragmentary cross section, to an enlarged scale, taken on the line 5—5 of Figure 2;

Figure 6 is a perspective view, to an enlarged scale, of one of the attaching clips; and Figure 7 is a perspective view, to an enlarged scale, of the other attaching member.

Referring to the drawings, there is illustrated a crash pad 10 which embodies the principal features of the invention and which is mounted in a conventional passenger vehicle in the manner shown in Figure 1. The vehicle, interior portions of which are shown in dotted line, has an instrument panel or dashboard 11 which extends inwardly and downwardly from the lower edge of the windshield 12, the latter being seated in a glazing channel 13 which is connected to the uppermost edge of the instrument panel 11 by bolts or like fastener members 14. The instrument panel 11 extends across the front of the vehicle and projects rearwardly somewhat from the plane of the windshield 12.

The pad 10 is mounted on the portion of the instrument panel 11 which extends adjacent the steering wheel in the front of the passenger space next to the operator of the car, and which is generally recognized as most dangerous to a front seat passenger in the event of a collision or sudden stopping of the forward movement of the car which tends to throw the front seat passenger forwardly.

The protective portion of the pad 10 comprises two generally rectangular, cushion-like pad members or sections 15 and 16 which are aligned in side-by-side relation and connected to each other by a series of snap fasteners or similar attaching devices 17. The snap fasteners 17 have their cooperating separable members mounted in overlapping flange formations 18 and 19 which extend from the back or bottom faces of the respective cushion or pad sections 15 and 16. Both pad sections 15 and 16 are attached to an elongate strip-like supporting member 20 by means of a series of snap fasteners 21 which have their cooperating separable members mounted in a bottom marginal portion of the supporting strip member 20, and flange formations 22 extending from the back or bottom faces of the cushion sections 15 and 16, respectively.

The cushion members 15 and 16 are preferably formed of a sheet-like covering material 23 which may be a fabric, a plastic film or any similar relatively flexible material and a filler 24 which is preferably foam rubber, a kapok or any resilient compressible material of a similar nature. The covering material 23 is formed into cushion-like shape by sewing, welding or otherwise forming the same for receiving the filler 24.

The elongate supporting strip 20 comprises a reversely folded strip of a covering material 25 (Figure 5) which may be a fabric, rubber sheeting or any other material similar to the covering material 23 of the cushion members 15 and 16. A stiffener element 26 is enclosed between the folds of the covering member 25 which may be of any relatively stiff yet bendable and resilient material which will afford sufficient rigidity to the member 20 to cause it to maintain its shape and remain in proper position along the top edge of the instrument panel 11. The supporting strip 20 is provided with a series of longitudinally spaced apertures 27, 28, 29, 30 and 31 which may be metal grommets and which are adapted to receive in threaded relation therethrough a relatively flexible cord-like connecting member 32. The cord member 32 is slidably connected to a pair of attaching clip members 33 which are adapted to be secured permanently in position on the interior of the vehicle.

The clip members 33 (Figure 6) each have a tongue forming portion or end 34 which has a diagonally inwardly extending slot 35 along one side edge. The other end of the member 33 is provided with a coiled portion forming a tubular guideway 36 for slidably receiving the fastening cord 32. The clips 33 are secured in relatively permanent relation within the vehicle by loosening one of the screws 14 (Figure 3) which secure the glazing channel 13 and inserting the same beneath the screw with the portion 36 of the clip in position for receiving the fastening cord 32 in sliding relation therein. The clips 33 are the only portion of the crash pad arrangement which are required to be installed in a relatively permanent position in the automobile.

The cord 32 is anchored at its one end in the grommet 27 by knotting the same or the like and extends through the clips 33 with an intermediate portion indicated at 37 being threaded through the grommets 28, 29 and 30 to provide a depending loop which has slidably mounted thereon a fastening clamp or clip member 38. The clip 38 (Figure 7) has a hook shape formation 39 on one end thereof which is adapted to be engaged with the inturned edge or flange 40 on the lower edge of the instrument panel 11. At its other end, the clip 38 is reversely curled to provide a guide section 41 through which the cord 32 is passed.

The crash pad 10 is installed on the instrument panel 11 by first securing the clips 33 in proper position beneath screws 14 with the guideway forming portions 36 approximately aligned across the vehicle for receiving the fastening cord member 32. The cord 32 is then anchored at the inner end in the grommet 27 and threaded through the fasteners 33 and the apertures 28, 29, 30 and 31 as illustrated in Figure 2 with the loop portion 37 depending from the grommet 29 beneath the center of the pad and carrying the bottom anchoring clip 38. The clip 38 is secured over the flange 40 of the instrument panel 11 and the cord 32 is then adjusted to provide the proper positioning of the cushion members 15 and 16 on the face of the panel 11, with the cushion members 15 and 16 being allowed to drape down over the bottom edge of the same and assume the general contour of the instrument panel 11 as indicated in Figures 1 and 3. If it is desired to have access to the glove compartment which is normally provided in the instrument panel 11 the cushion members 15 and 16 may be separated from each other by disconnecting the snaps 17 whereupon they may be individually hinged upwardly to permit opening of the glove compartment door. If it is desired to remove the cushion members 15 and 16 temporarily for any reason, the cushion members 15 and 16 may be individually disconnected from the supporting strip 20 by releasing the snaps 21. The entire pad 10 may, of course, be released for removal from the instrument panel 11 by withdrawing the connecting cord 32 through the grommets 28, 29, 30 and 31.

While specific materials and particular details of construction have been referred to in describing the illustrated form of the invention, it will be apparent that other materials and other details of construction may be resorted to within the spirit of the invention.

I claim:

1. A cushioning appliance for covering a portion of an instrument panel of a vehicle comprising a relatively flexible cushioning pad adapted to conform to the surface of the instrument panel and a relatively narrow elongate supporting strip member therefor, said pad being detachably connected along the top edge to said supporting strip member, said strip member being provided along its opposite edge with a plurality of apertures and a fastening cord member threaded therethrough, and a plurality of attaching clips adapted to be secured in fixed relation adjacent the upper edge of the instrument panel and having a slidable connection with the cord member.

2. A cushioning device adapted to cover and generally conform to at least a portion of the shelf surface and front face of a vehicle instrument panel, comprising, a pair of pad members detachably connected to each other and individually connected to a relatively stiff top supporting strip which is provided along its top edge with a plurality of spaced apertures for receiving in threaded relation therethrough a fastening cord member, spaced attaching clips adapted to be secured in fixed relation at the upper edge of the instrument panel and adapted to be slidably connected with the cord member, and a clamp element slidably connected with an intermediate portion of the cord member and adapted to be engaged with the lower edge portion of the instrument panel.

3. A vehicle instrument panel crash pad adapted to protect the vehicle occupants from injurious impact against the instrument panel, which comprises a pair of cushioning members adapted to conform to the shape of at least a portion of the instrument panel and to engage the outer surface of said panel, said cushioning members being detachably connected to each other and each being detachably connected to a supporting strip member adapted to extend across the top of the instrument panel, said supporting strip member having longitudinally spaced apertures therein, a flexible cord-like fastening element threaded through the apertures in the strip member, a pair of spaced clips adapted to be anchored to the top of the instrument panel and having guideways for receiving the cord member, and a clip slidably connected to the cord member at an intermediate point and adapted to be engaged with the bottom edge of the instrument panel.

4. A cushioning appliance for covering a portion of an instrument panel of a vehicle comprising a cushioning member adapted to conform to the surface of the instrument panel, a relatively narrow elongate supporting strip member of relatively rigid material which is provided with a plurality of apertures, a fastening cord member threaded through said apertures, and a plurality of attaching clips adapted to be secured to the instrument panel and having a slidable connection with the cord member.

5. A cushioning appliance for covering a portion of an instrument panel of a vehicle comprising a two part cushion member adapted to conform to the surface of the instrument panel, a relatively flat narrow supporting strip member, said strip member being detachably connected to said cushion member along its lower edge and having along its opposite edge a plurality of apertures, a fastening cord member adapted to be threaded through said apertures, and a plurality of plate-like attaching clips adapted to be detachably secured to the instrument panel and having apertures therein for slidable connection with the cord member.

6. A cushioning device adapted to cover and generally conform to at least a portion of the shelf surface and front face of a vehicle instrument panel, comprising, a pair of laterally aligned cushion members detachably connected to each other, a top supporting member, means individually connecting said cushion members to said supporting member, said supporting member having a plurality of spaced apertures, a fastening cord positioned in threaded relation in said apertures, vertically spaced attaching clips adapted to be secured to the instrument panel and adapted to be slidably connected with the cord member.

7. A cushioning device adapted to cover and generally conform to at least a portion of the shelf surface and front face of a vehicle instrument panel, comprising, a pair of cushion members of substantial thickness detachably connected to each other along adjacent edges, a relatively narrow flat top edge member, said cushion members being detachably connected to said top edge member, said top edge member having apertures at each end and at the center thereof, a fastening cord member adapted to be threaded through said apertures, spaced attaching clips adapted to be secured in fixed relation at the upper edge of the instrument panel and having guide formations for slidably connecting the same with the cord member, and a hook shaped clamp element slidably connected with an intermediate looped portion of the cord member which depends from a center aperture in said edge member and adapted to be engaged beneath the bottom edge of the instrument panel.

References Cited in the file of this patent

UNITED STATES PATENTS

| 2,560,009 | Straith | July 10, 1951 |
| 2,606,755 | Samuels | Aug. 12, 1952 |
| 2,626,163 | Scantlebury | Jan. 20, 1953 |
| 2,760,788 | Segall | Aug. 28, 1956 |

FOREIGN PATENTS

| 54,766 | Switzerland | Feb. 13, 1911 |